United States Patent
Kim et al.

(10) Patent No.: US 12,444,787 B2
(45) Date of Patent: Oct. 14, 2025

(54) BATTERY RACK

(71) Applicant: SK On Co., Ltd., Seoul (KR)

(72) Inventors: Yun Hee Kim, Daejeon (KR); Tae Hyun Chang, Daejeon (KR); Suk Chul Kim, Daejeon (KR); Yong Uk Kim, Daejeon (KR); Byung Jun Park, Daejeon (KR); Jong Ho Seok, Daejeon (KR); Dong Hwa Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 685 days.

(21) Appl. No.: 17/844,359

(22) Filed: Jun. 20, 2022

(65) Prior Publication Data
US 2023/0033625 A1    Feb. 2, 2023

(30) Foreign Application Priority Data
Jul. 28, 2021    (KR) ........................ 10-2021-0099001

(51) Int. Cl.
| | | |
|---|---|---|
| *H01M 10/6568* | (2014.01) | |
| *H01M 10/613* | (2014.01) | |
| *H01M 10/6556* | (2014.01) | |
| *H01M 50/30* | (2021.01) | |

(52) U.S. Cl.
CPC ..... *H01M 10/6568* (2015.04); *H01M 10/613* (2015.04); *H01M 10/6556* (2015.04); *H01M 50/30* (2021.01)

(58) Field of Classification Search
CPC ........................ H01M 10/6552; H01M 10/613
See application file for complete search history.

(56) References Cited

U.S. PATENT DOCUMENTS

| | | | |
|---|---|---|---|
| 9,093,726 B2 | 7/2015 | Prilutsky et al. | |
| 10,978,756 B2 | 4/2021 | Inoue | |
| 2009/0286141 A1* | 11/2009 | Nakamura | H01M 10/0565 429/82 |
| 2010/0136391 A1* | 6/2010 | Prilutsky | H01M 10/6566 429/62 |
| 2011/0229753 A1 | 9/2011 | Kim | |

(Continued)

FOREIGN PATENT DOCUMENTS

| | | |
|---|---|---|
| JP | 2011-060755 A | 3/2011 |
| JP | 2015-222701 A | 12/2015 |

(Continued)

OTHER PUBLICATIONS

Extended European Search Report for the European Patent Application No. 22181899.0 issued by the European Patent Office on Jun. 9, 2023.

(Continued)

*Primary Examiner* — Maria Laios
*Assistant Examiner* — Benjamin T Lustgraaf
(74) *Attorney, Agent, or Firm* — IP & T GROUP LLP (57) ABSTRACT

A battery rack includes: a housing; a module unit provided in the housing, including a plurality of battery cells, and having at least one vent hole; and a cooling unit provided to face the vent hole in the housing, and including a cooling line in which a coolant is provided, wherein the cooling line is provided so that at least a portion of an outer periphery thereof is melted by heat generated from the module unit to supply the coolant toward the vent hole.

14 Claims, 10 Drawing Sheets

(56) References Cited

U.S. PATENT DOCUMENTS

| | | | | |
|---|---|---|---|---|
| 2014/0011059 A1* | 1/2014 | Hashimoto | ............. | B60L 1/003 |
| | | | | 429/72 |
| 2015/0340745 A1* | 11/2015 | Inoue | ................. | H01M 10/625 |
| | | | | 429/120 |
| 2018/0191038 A1* | 7/2018 | Li | ..................... | H01M 10/0525 |
| 2019/0393567 A1* | 12/2019 | Ju | ........................... | B60L 50/64 |
| 2021/0021002 A1 | 1/2021 | Lee | | |
| 2021/0226290 A1 | 7/2021 | Lee | | |
| 2022/0093995 A1 | 3/2022 | Huang et al. | | |

FOREIGN PATENT DOCUMENTS

| | | |
|---|---|---|
| KR | 10-2010-0059505 A | 6/2010 |
| KR | 10-2018-0113809 A | 10/2018 |
| KR | 10-2020-0041708 A | 4/2020 |
| KR | 10-2020-0098058 A | 8/2020 |
| WO | 2021/057283 A1 | 4/2021 |

OTHER PUBLICATIONS

Office Action for Korean Patent Application No. 10-2021-0099001 issued by the Korean Patent Office on May 14, 2025.

* cited by examiner

BATTERY RACK

CROSS-REFERENCE TO RELATED APPLICATION(S)

This application claims benefit of priority to Korean Patent Application No. 10-2021-0099001 filed on Jul. 28, 2021 in the Korean Intellectual Property Office, the disclosure of which is incorporated herein by reference in its entirety.

BACKGROUND

1. Field

The present disclosure relates to a battery rack.

2. Description of Related Art

Secondary batteries, which are capable of charging and discharging electricity, are applicable to a wide range of devices from portable electronic devices having a relatively small size to vehicles and power storage devices having a medium or large size.

Such a secondary battery may be used in the form of a secondary battery cell. In the secondary battery cell, a stack including a positive electrode, a negative electrode, and a separator is disposed with an electrolyte filled inside an exterior material.

A plurality of secondary battery cells may be collected and electrically connected to each other to form a module or a pack. Also, a plurality of modules or packs may be collected and electrically connected to each other to form a battery rack. In addition, a plurality of battery racks may be electrically connected to each other to form an energy storage system (ESS).

Since a large number of secondary battery cells are densely formed in such an energy storage system, if flames or an explosion occurs in any one of the secondary battery cells, the fire or the explosion may easily propagate or be transferred to an adjacent secondary battery cell. In addition, since a high voltage is applied to the energy storage system, if flames or an explosion occurs in the energy storage system, this may cause significant damage.

Thus, it is a very important issue to prevent or suppress flames or an explosion in a secondary battery cell, which is a minimum unit constituting the energy storage system, and to prevent or suppress the expansion of flames or an explosion from a secondary battery cell where the fire or the explosion has first occurred to other secondary battery cells.

RELATED ART DOCUMENT (Patent Document 1) KR 10-2010-0059505 A (Jun. 4, 2010)

SUMMARY

An aspect of the present disclosure may provide a battery rack capable of suppressing or preventing a battery cell from being overheated or ignited, and delaying or preventing propagation from an area in which ignition starts to other areas.

Another aspect of the present disclosure may provide a battery rack capable of delaying or suppressing flames or an explosion therein.

According to an aspect of the present disclosure, a battery rack may include: a housing; a module unit provided in the housing, including a plurality of battery cells, and having at least one vent hole; and a cooling unit provided to face the vent hole in the housing, and including a cooling line in which a coolant is provided, wherein the cooling line is provided so that at least a portion of an outer periphery thereof is melted by heat generated from the module unit to supply the coolant toward the vent hole.

The cooling unit may further include a fixing line accommodating the cooling line therein, and formed of a material having a different phase change temperature from a material of the outer periphery of the cooling line.

The fixing line may include an open portion and a hollow portion, and the cooling line may be accommodated in the fixing line to directly face the vent hole in the open portion, while being present in the open portion and the hollow portion.

The open portion may be formed by spacing ends of the fixing line apart from each other in a cross section of the fixing line in a thickness direction.

The cooling line may include a first material having a first phase change temperature on the outer periphery thereof, the fixing line may include a second material having a second phase change temperature on the outer periphery thereof, and the first phase change temperature may be lower than the second phase change temperature.

The first material may be rubber or thermoplastic plastic, and the second material may be metal.

The cooling line may be accommodated in the fixing line to directly face each of the at least one vent hole, and the fixing line may surround at least 50% of the outer periphery of the cooling line.

The module unit may be accommodating at least one of the battery cells, and formed by stacking a plurality of sub-module cases formed the vent hole.

The cooling line may be formed of a plurality of materials having different phase change temperatures.

The cooling line may include a third material on the outer periphery thereof in an area facing the vent hole, and a fourth material having a higher phase change temperature than the third material in the other area excluding the area formed of the third material.

The cooling line may include an opening member being present in the outer periphery thereof and formed of a material including the third material, and provided to be separated from the area formed of the fourth material.

The cooling line may include a discharge hole in the area facing the vent hole, and the opening member may be inserted into the discharge hole.

A plurality of discharge holes may be provided to each face a corresponding one of the at least one vent hole, and a plurality of opening members may be inserted into the discharge holes, respectively.

The third material may be rubber or thermoplastic plastic, and the fourth material may be metal.

The sub-module case may include at least one notch provided in communication with the vent hole and guiding the coolant toward the vent hole.

The cooling unit may further include a fixing cover connected to the module unit or the housing to fix the cooling line.

The battery rack may further include a drainage unit disposed below the cooling unit in the housing, and provided to collect falling coolant.

The drainage unit may include: a drain plate disposed to be inclined on a lower side of the housing, and allowing the coolant to fall thereonto; and a drain pipe connected to the drain plate, and discharging the coolant to the outside of the housing.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

In order to facilitate the understanding of the description of exemplary embodiments of the present disclosure, elements denoted by the same reference numerals in the accompanying drawings are the same elements, and among elements performing the same function in the respective exemplary embodiments, relevant elements are denoted by the same or similar reference numerals.

Further, in order to clarify the gist of the present disclosure, the description of elements and techniques well known in the related art will be omitted, and the present disclosure will hereinafter be described in detail with reference to the accompanying drawings.

It is to be understood, however, that the spirit and the scope of the present disclosure are not limited to the exemplary embodiments presented herein, but other forms may be suggested by those skilled in the art while specific components are added, changed, or deleted without departing from the spirit and the scope of the present disclosure.

In accompanying drawings, an X-axis refers to a direction in which battery cells provided in a battery rack are stacked, a Y-axis refers to a width direction of the battery rack, and a Z-axis refers to a length direction of the battery rack.

Figure 1:
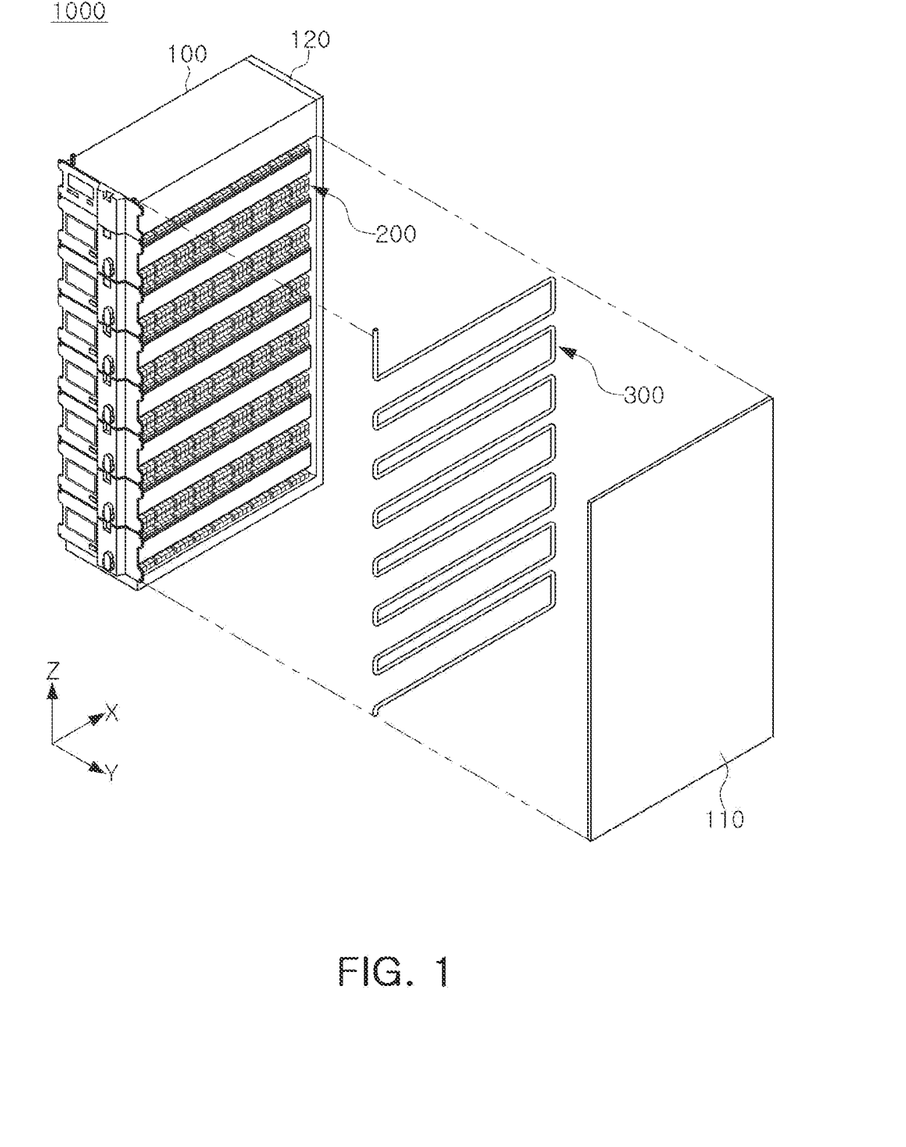
FIG. 1 is a partially exploded perspective view of a battery rack according to an exemplary embodiment of the present disclosure.

FIG. 1 illustrates a partially exploded perspective view of a battery rack 1000 according to an exemplary embodiment of the present disclosure.

As shown in FIG. 1, the battery rack 1000 according to an exemplary embodiment of the present disclosure may include a housing 100 forming the exterior of the battery rack, a module unit 200 formed by a plurality of battery cells provided in the housing 100, and a cooling unit 300 provided to face the module unit 200 in the housing 100 and accommodating a coolant therein.

In an exemplary embodiment of the present disclosure, the module unit 200 may be formed by stacking the plurality of battery cells in the X-axis direction.

In addition, a plurality of module units 200 may be provided and stacked in the Z-axis direction in the housing 100.

In addition, the plurality of module units 200 may be spaced apart from one another by a predetermined distance in the Z-axis direction. A space formed by spacing the module units 200 apart from one another in the Z-axis direction may serve as a passage for cooling the module units 200 using an external fluid, and the external fluid may be, for example, air.

In an exemplary embodiment of the present disclosure, the housing 100 may include side panels 110 fastened to both sides thereof and a rear panel 120 fastened to a rear side thereof. The side panels 110 and the rear panel 120 may constitute the housing 100, while each being spaced apart from the module units 200 by a predetermined distance.

A space formed by spacing the rear panel 120 apart from the module units 200 may serve as a flow path through which the external fluid moves to cool the module units 200.

In an exemplary embodiment of the present disclosure, a separate cooling fan (not shown), which is not illustrated in the drawings, may be installed in the housing 100. The external fluid may be introduced into the space (not shown) between the module units 200 and the space (not shown) between the module units 200 and the rear panel 120 by the cooling fan (not shown), and the external fluid having passed through the space (not shown) between the module units 200 and the space between the module units 200 and the rear panel 120 may be discharged to the outside of the housing 100.

The external fluid may be air, but the present disclosure is not limited thereto. The type of external fluid may be appropriately selected and applied according to environments where the battery rack is used, requirements for the battery rack, etc.

The cooling unit 300 may be disposed in the space formed by spacing the module units 200 apart from the side panel 110. The cooling unit 300 may extend in at least one of the X-axis direction and the Z-axis direction to face all of the plurality of module units 200.

In an exemplary embodiment of the present disclosure, the cooling unit 300 may include a pipe containing a coolant therein, and at least a portion of an outer periphery of the pipe may be disposed to face the module units 200.

The outer periphery of the pipe may be formed of a material that is melted by heat generated from the module unit 200. According to this exemplary embodiment, the outer periphery of the pipe can be melted by heat generated from the module unit 200, and the coolant can be discharged to the outside of the pipe. The coolant discharged to the outside of the pipe may be used to cool the module unit 200.

In an exemplary embodiment of the present disclosure, the type of coolant may be water, but the present disclosure is also not limited thereto. The type of coolant may be appropriately selected and applied according to environments where the battery rack is used, requirements for the battery rack, etc.

Figure 2:
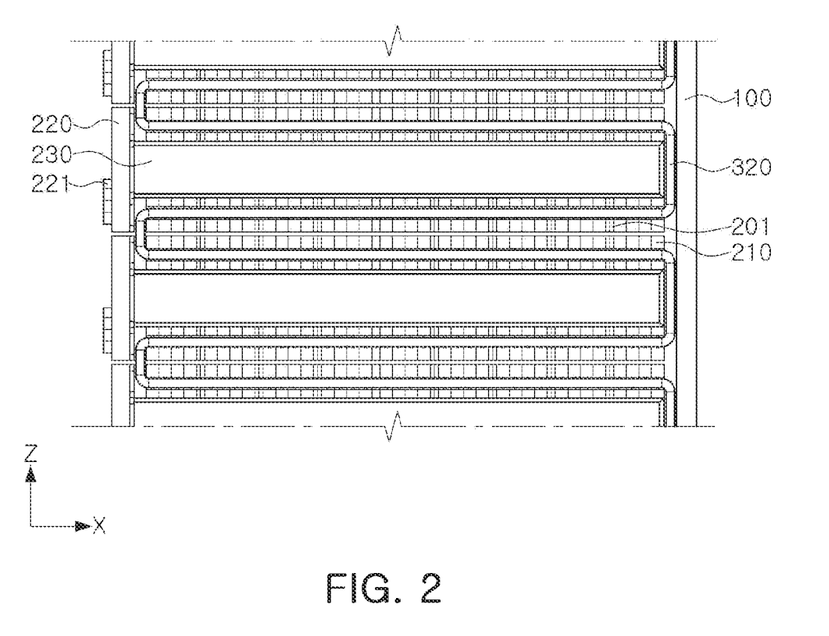
FIG. 2 is a partially enlarged view of a cross section of the battery rack according to an exemplary embodiment of the present disclosure when cut in a side surface direction thereof.

FIG. 2 is a partially enlarged view of a cross section of the battery rack according to an exemplary embodiment of the present disclosure when cut in a side surface direction thereof.

As shown in FIG. 2, the module unit 200 (in FIG. 1) may include a plurality of sub-module cases 210 stacked in the X-axis direction, at least one pad member 201 disposed between the sub-module cases 210, a frame 230 surrounding side surfaces of the sub-module cases 210 and the pad member 201, a front panel 220 surrounding a front surface of the sub-module case 210 or the pad member 201 and exposed to the outside of the housing 100, and a connection member 221 disposed on the front panel 220 and electrically connecting the plurality of module units 200 (in FIG. 1) to each other.

A bus bar (not shown) connected to leads (not shown) of the battery cells provided in the sub-module cases 210 may be provided on an inner surface of the frame 230. The bus bar (not shown) may be electrically connected to the connection member 221.

The pad member 201 may serve to cool the sub-module cases 210 or absorb expansion of the sub-module cases 210 according to expansion of the battery cells (not shown).

Meanwhile, the cooling unit 300 (in FIG. 1) may include a fixing line 320 extending in the X-axis direction and in the Z-axis direction to face the sub-module cases 210. The fixing line 320 may be a pipe as described above. And the line mentioned in the present specification may refer to a pipe.

Figure 3:
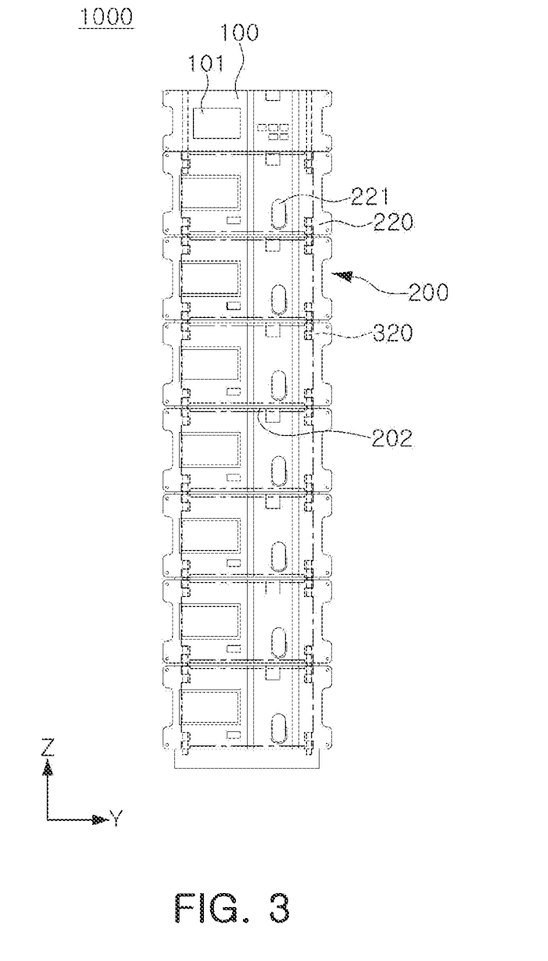
FIG. 3 is a partial front view of the battery rack according to an exemplary embodiment of the present disclosure.

FIG. 3 is a partial front view of the battery rack 1000 according to an exemplary embodiment of the present disclosure.

As shown in FIG. 3, the plurality of module units 200 may be spaced apart from one another by a predetermined distance in the Z-axis direction, and a space formed by spacing the plurality of module units 200 apart from one another may serve as a cooling passage 202. The cooling passage 202 may be a flow path of an external fluid as described above, and the external fluid may be air.

Front panels 220 may be provided on respective front sides of the module units 200, and connection members 221 may be provided on the respective front panels 220. The connection members 221 may be electrically connected to a control unit 101 disposed at an upper portion of the housing 100.

A fixing line 320 may be disposed on one side of the module unit 200, and another fixing line 320 may also be disposed on the other side of the module unit 200.

Figure 4:
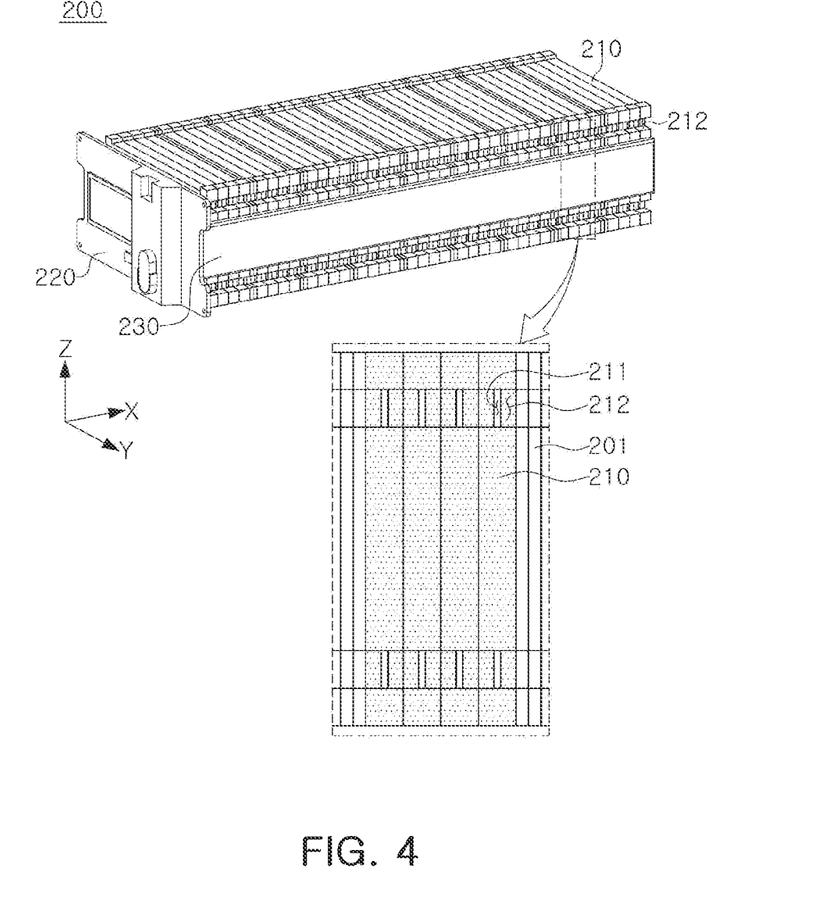
FIG. 4 is a perspective view of a module unit according to an exemplary embodiment of the present disclosure.

FIG. 4 is a perspective view of the module unit 200 according to an exemplary embodiment of the present disclosure.

As shown in FIG. 4, the module unit 200 may be formed by stacking a plurality of sub-module cases 210. At least one battery cell (not shown) may be accommodated in the sub-module case 210.

The sub-module case 210 may have a space (not shown) through which a lead (not shown) of the battery cell (not shown) is drawn out. The sub-module case 210 may include a recess portion 212 concavely formed on an outer periphery thereof in a +Y direction or in a −Y direction.

The recess portion 212 may be formed on each of both sides of the sub-module case 210, and a plurality of recess portions 212 may be formed on each side of the sub-module case 210 in a +Z direction or in a −Z direction.

A vent hole 211 may be disposed in the recess portion 212. The vent hole 211, which is a through-hole formed in the sub-module case 210 so that an internal space of the sub-module case 210 communicates with the outside, may serve as a passage through which gas inside the sub-module case 210 is discharged to the outside of the sub-module case 210.

The vent hole 211 may be covered with a cover member (not shown) in a normal state. The cover member (not shown) may be attached to the sub-module case 210 by an adhesive or the like. If a battery cell fires or explodes, the cover member (not shown) may be detached from the sub-module case 210 by virtue of the fluid discharged from the inside of the sub-module case, particles that may be generated when the battery cell catches fire or explodes, and the like, thereby opening the vent hole 211. However, the vent hole 211 may be open, rather than being covered with the cover member (not shown).

A front panel 220 may be disposed in front of the outermost sub-module case 210 among the plurality of the sub-module cases 210 constituting the module unit 200, and frames 230 may extend from both sides of the front panel 220, respectively. The frames 230 may easily fix the plurality of the sub-module cases 210 by surrounding side surfaces of the plurality of the sub-module cases 210 stacked. If necessary, the frames 230 may surround the rear of the sub-module case 210, but the present disclosure is not limited thereto.

Figure 5:
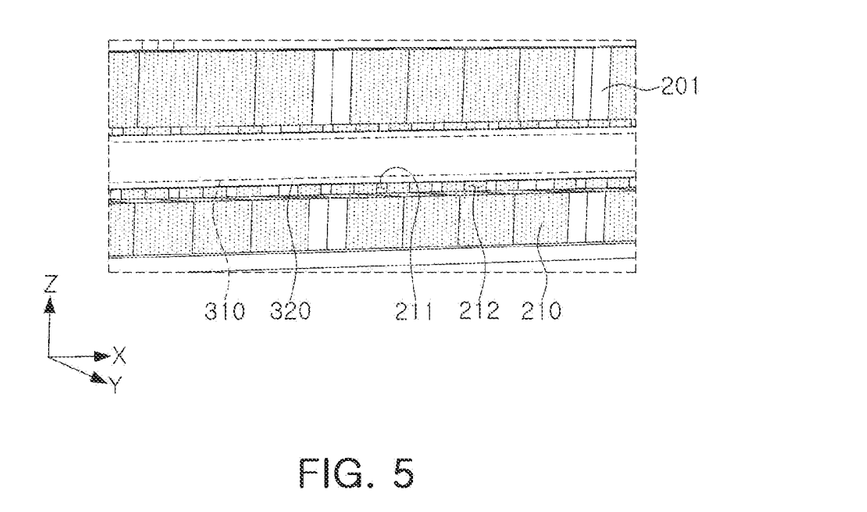
FIG. 5 is a partially enlarged view of a module unit and a cooling unit according to an exemplary embodiment of the present disclosure.

FIG. 5 is a partially enlarged view of the module unit 200 (in FIG. 1) and the cooling unit 300 (in FIG. 1) according to an exemplary embodiment of the present disclosure.

As shown in FIG. 5, the fixing line 320 of the cooling unit may be disposed to face the vent hole 211 of the sub-module case 210 in the housing 100 (in FIG. 1).

The fixing line 320 may be inserted into the recess portion 212 of the sub-module case 210, and the fixing line 320 may be disposed to face each of the vent holes 211 of the plurality of sub-module cases 210 in the housing 100.

A cooling line 310 may be accommodated inside the fixing line 320, and the cooling line 310 may also be disposed inside the fixing line 320 to face each of the vent holes 211 of the plurality of sub-module cases 210.

The cooling line 310 may be provided so that the coolant is present inside the cooling line 310 in a normal state, but the coolant is discharged to the outside of the cooling line 310 when at least a portion of the cooling line 310 is melted by heat transferred from substances discharged through the vent hole 211 in a case in which a battery cell (not shown) fires or explodes.

At this time, since the cover member (not shown), which closes the vent hole 211 in the normal state, is detached from the sub-module case 210 by virtue of the substances ejected through the vent hole 211, the vent hole 211 becomes opened. However, in a case in which the cover member (not shown) is provided in a hinged manner to open or close the vent hole 211 by moving around the sub-module case 210, the cover member (not shown) may be moved from the sub-module case 210 due to the pressure of the fluid or particles discharged from the vent hole 211, and the vent hole 211 may become opened.

When the vent hole 211 becomes opened as described above, the coolant present inside the cooling line 310 may flow into the sub-module case 210 through the vent hole 211, and the battery cell (not shown) present inside the sub-module case 210 may be cooled by the coolant.

According to this exemplary embodiment, the coolant can be supplied through the vent hole 211 at a position closest to an overheated or ignited battery cell, thereby reducing an amount of time in which the coolant reaches the battery cell requiring the coolant. As a result, it is possible to quickly lower a temperature of the overheated or ignited battery cell, and it is also possible to delay or prevent the propagation of flames or an explosion to other battery cells or other areas of the battery rack.

Figure 6:
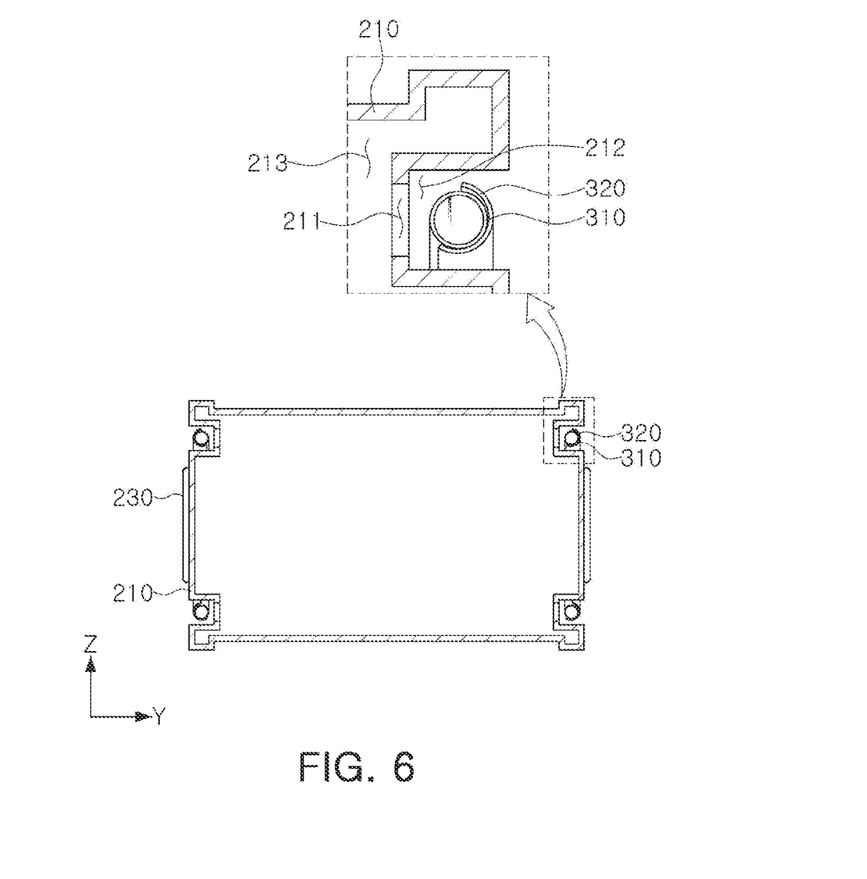
FIG. 6 is a front view of a sub-module case and a cooling unit.

FIG. 6 is a front view of the sub-module case 210 and the cooling unit 300 (in FIG. 1) disposed on the sub-module case 210.

As shown in FIG. 6, at least one battery cell (not shown) may be accommodated in the internal space 213 of the sub-module case 210.

The fixing line 320 may fix the cooling line 310 in a state where at least a portion of the cooling line 310 is exposed so that at least a portion of the cooling line 310 directly faces the vent hole 211. The fixing line 320 may have a shape to surround at least a portion of the cooling line 310.

A coolant is accommodated in the cooling line 310. Both ends (not shown) of the cooling line 310 may be connected to a separate pump (not shown) or the like such that the coolant accommodated in the cooling line 310 circulates along the cooling line 310, but the present disclosure is not limited thereto.

An outer periphery of the fixing line 320 may include a different material from an outer periphery of the cooling line 310, and the material included the outer periphery of the fixing line 320 may have a higher phase change temperature than the material included the outer periphery of the cooling line 310. In this case, the phase change temperature may be a melting point.

In an exemplary embodiment of the present disclosure, the cooling line 310 may include a first material having a first phase change temperature, and the fixing line 320 may include a second material having a second phase change temperature.

In an exemplary embodiment of the present disclosure, the first phase change temperature may be a value in the range of 140° C. or more and 220° C. or less. In addition, the second phase change temperature may be a value in the range of more than 220° C. and 1540° C. or less.

According to this exemplary embodiment, it is possible to prevent the fixing line 320 from being melted even though the outer periphery of the cooling line 310 is melted by high-temperature substances discharged through the vent hole 211 in a case in which flames or an explosion occurs.

If a battery cell (not shown) is overheated or ignited, high-temperature substances may be discharged to the outside of the sub-module case 210 through at least one vent hole 211 located close to the overheated or ignited battery cell (not shown).

Then, at least a partial portion of the outer periphery of the cooling line 310 may be melted by heat, and accordingly, the coolant present inside the cooling line 310 may be discharged to the outside of the cooling line 310.

In an exemplary embodiment of the present disclosure, the phase change temperature of the cooling line 310 may be a value in the range of 140° C. or more and 220° C. or less. In this case, the phase change temperature of the fixing line 320 may be a value in the range of more than 220° C. and 1540° C. or less.

In an exemplary embodiment of the present disclosure, the first material may be rubber or thermoplastic plastic, and the second material may be metal.

When the first material is rubber or thermoplastic plastic, the first material has elasticity. Therefore, the cooling line 310 may contract when the cooling line 310 is being inserted into the fixing line 320 through an open area thereof, and the cooling line 310 may be recovered to its original elasticity when the insertion of the cooling line 310 into the fixing line 320 is completed. According to this exemplary embodiment, it is possible to improve efficiency and convenience in assembling the fixing line 320 and the cooling line 310 together.

Also, in an exemplary embodiment of the present disclosure, the first material may be polyethylene (PE) or polypropylene (PP), and the second material may include iron or aluminum. In a case in which the second material is iron, the second material may have a phase change temperature of about 1538° C., making it possible to improve the durability of the fixing line 320. On the other hand, in a case in which the second material is aluminum, the second material may have a phase change temperature of about 661° C., making it possible to reduce a weight of the battery rack because aluminum is lighter than iron. However, the present disclosure is not limited thereto, and the types of materials may be appropriately selected and applied according to environments in which the battery rack is used and requirements for the battery rack. Alternatively, the second material may be an alloy to improve corrosion resistance, or a corrosion resistance coating may be applied onto an outer surface of the fixing line.

In addition to the above-described second material, the fixing line 320 may include a material capable of maintaining its shape even if flames or an explosion occurs or even in a relatively high temperature environment. The fixing line 320 including a material capable of maintaining its shape even in a high temperature environment or even in an environment where flames or an explosion has occurred makes it possible to smoothly maintain the flow of the coolant discharged from the cooling line 310 even in a high temperature, fire, or explosion environment.

Figure 7:
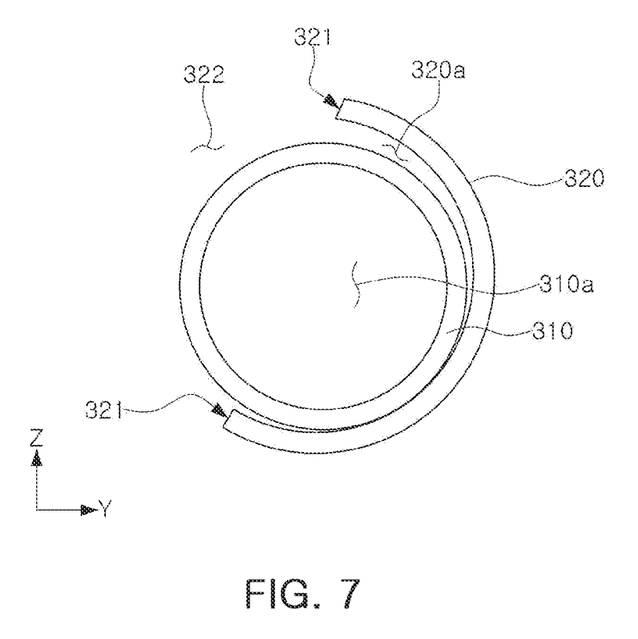
FIG. 7 is a front view of a fixing line and a cooling line according to an exemplary embodiment of the present disclosure.

FIG. 7 illustrates a front view of the fixing line 320 and the cooling line 310 according to an exemplary embodiment of the present disclosure.

As shown in FIG. 7, the fixing line 320 includes a hollow inside, and the hollow may form a hollow portion 320*a*. Opposite ends 321 of the fixing line 320 may be spaced apart from each other, and an open portion 322 may be formed between the opposite ends 321.

The cooling line 310 may also include a hollow inside, and the hollow may form another hollow portion 310*a*. The cooling line 310 may be inserted into the fixing line 320 through the open portion 322 to be placed in the hollow portion 320*a* of the fixing line 320.

As described above, the cooling line 310 may contract due to elasticity thereof while being inserted through the open portion, and may be recovered to original elasticity thereof when the insertion of the cooling line 310 into the hollow portion 320*a* of the fixing line 320 is completed.

At least a portion of the outer periphery of the cooling line 310 having been inserted into the hollow portion 320*a* of the fixing line 320 may be present in the open portion 322, and at least a portion of the outer periphery of the cooling line 310 exposed through the open portion 322 may directly face the vent hole 211 (in FIG. 6).

According to this exemplary embodiment, heat discharged from the vent hole 211 (in FIG. 6) can be quickly and easily transferred to the cooling line 310, and the coolant present in the hollow portion 310*a* of the cooling line 310 can be quickly discharged to the outside of the cooling line 310.

In an exemplary embodiment of the present disclosure, the fixing line 320 may surround at least 50% of the outer periphery of the cooling line 310. According to this exemplary embodiment, while preventing the cooling line 310 from escaping away from the fixing line 320, the coolant inside the cooling line 310 can be easily discharged to the outside of the cooling line 310.

Figure 8:
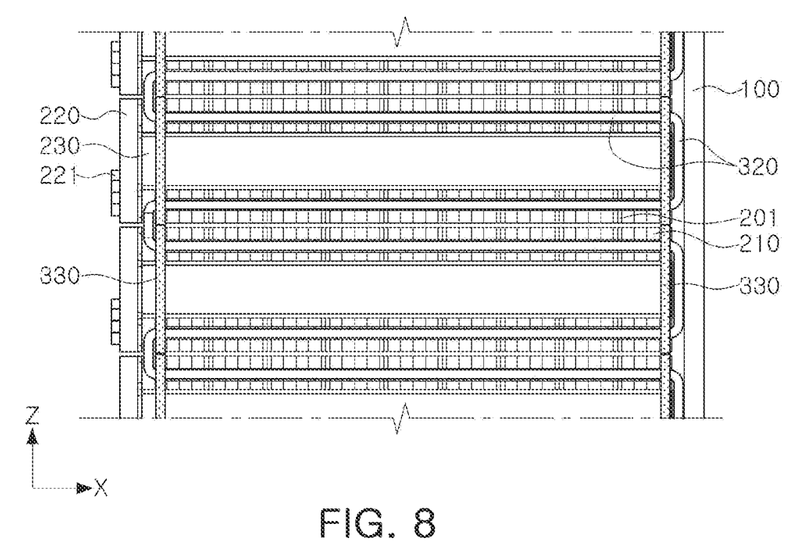
FIG. 8 is a partially enlarged view of a cross section of a battery rack according to another exemplary embodiment of the present disclosure when cut in a side surface direction thereof.

FIG. 8 is a partially enlarged view of a cross section of a battery rack according to another exemplary embodiment of the present disclosure when cut in a side surface direction thereof.

As shown in FIG. 8, the cooling unit 300 (in FIG. 1) of the battery rack according to another exemplary embodiment of the present disclosure may further include a fixing cover 330 connected to the module unit 200 (in FIG. 1) or the housing 100 (in FIG. 1) to fix the cooling line 310 (in FIG. 5).

The fixing cover 330 may fix the cooling line 310 (in FIG. 5) by fixing the fixing line 320 in which the cooling line 310 (in FIG. 5) is accommodated, or fix the cooling line 310 (in FIG. 5) by directly contacting the cooling line 310 (in FIG. 5).

In the exemplary embodiment illustrated in FIG. 8, the fixing cover 330 fixes the cooling line 310 by fixing the fixing line 320.

A plurality of fixing covers 330 may be provided and applied to a section in which the fixing line 320 extends in a direction parallel to the Z-axis.

Figure 9:
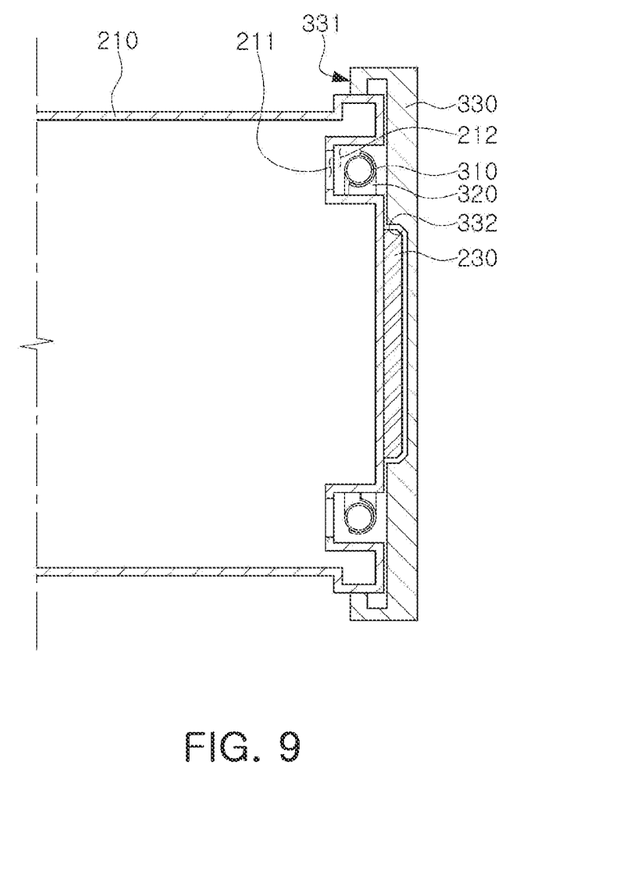
FIG. 9 is a partial front view of a state in which a fixing cover is fastened to a sub-module case.

FIG. 9 is a partial front view of a state in which the fixing cover 330 illustrated in FIG. 8 is fastened to the sub-module case 210.

As shown in FIG. 9, one end 331 of the fixing cover 330 may be bent to contact the outer periphery of the sub-module case 210, and the other end of the fixing cover 330 may also be bent to contact the outer periphery of the sub-module case 210. The fixing cover 330 may be fixed to the sub-module case 210 by virtue of the both ends 331 of the fixing cover 330 pressing the sub-module case 210.

To this end, the fixing cover 330 may be formed of an elastic material, but the present disclosure is also not limited thereto. In a case in which the fixing cover 330 is formed of a non-elastic material, both ends 331 of the fixing cover 330 may be bonded to the sub-module case 210 by an adhesive or the like.

The fixing cover 330 may be fixed to the sub-module case 210 so that an inner surface thereof covers at least one of the cooling line 310 and the fixing line 320, and may have an avoidance groove 332 in the inner surface thereof to accommodate the frame fixing the sub-module case 210 therein.

The fixing cover 330 may serve to prevent at least one of the cooling line 310 and the fixing line 320 from escaping to the outside of the sub-module case 210. In an exemplary embodiment of the present disclosure, the outer periphery of at least one of the cooling line 310 and the fixing line 320 may contact the sub-module case 210 in the recess portion 212 of the sub-module case 210, and a lower portion thereof may be supported by the sub-module case 210.

An outer surface of the fixing cover 330 may contact an inner surface of the housing 100 (in FIG. 1), but the present disclosure is not limited thereto, and may be appropriately selected and applied according to environments where the battery rack is used and requirements for the battery rack.

Figure 10:
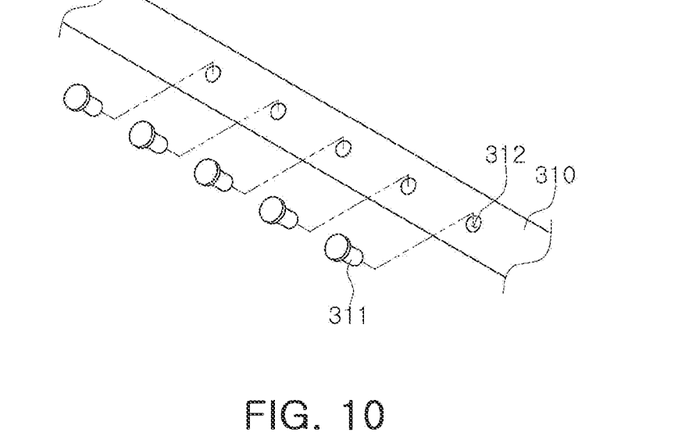
FIG. 10 is a perspective view of a cooling line according to another exemplary embodiment of the present disclosure.

FIG. 10 illustrates a cooling line 310 according to another exemplary embodiment of the present disclosure. In this case, the cooling line 310 may be used alone without a fixing line 320 (in FIG. 5), and the cooling line 310 may be directly seated in the recess portion 212 (in FIG. 5) of the sub-module case 210 (in FIG. 5) to face the vent hole 211 (in FIG. 5).

The cooling line 310 may accommodate a coolant therein, and may be formed of a material including a third material on the outer periphery thereof in at least a partial area facing the vent hole 211 (in FIG. 5) and a material including a fourth material in the other area excluding the area formed of the third material.

In an exemplary embodiment of the present disclosure, the fourth material may have a higher phase change temperature than the third material. The third material may be rubber or thermoplastic plastic, and the fourth material may be metal. According to this exemplary embodiment, in a case in which high-temperature substances are discharged from the vent hole 211 (in FIG. 5), only the portion formed of the third material in the cooling line is melted, and the coolant present inside the cooling line is discharged to the outside of the cooling line through the portion that had been formed of the third material before being melted.

In an exemplary embodiment of the present disclosure, the third material may be polyethylene (PE) or polypropylene (PP), and the fourth material may include iron or aluminum.

In addition, in an exemplary embodiment of the present disclosure, the cooling line 310 may include a plurality of discharge holes 312, and the discharge holes 312 may be provided at a position facing the vent hole 211 (in FIG. 5).

Opening members 311 may be inserted and fixed into the discharge holes 312, respectively. In an exemplary embodiment of the present disclosure, the cooling line 310 may be formed of the fourth material, and the opening member 311 may be formed of the third material.

The opening member 311 closes the discharge hole 312 in a normal state, but is melted by high-temperature substances discharged from the vent hole 211 (in FIG. 5) to open the discharge hole 312.

Then, the coolant present inside the cooling line 310 is discharged to the outside of the cooling line 310 through the discharge hole 312, and the coolant flows into the vent hole 211 (in FIG. 5) to extinguish flames or an explosion.

In this case, the cooling line 310 may be used alone without a fixing line 320 (in FIG. 5), making it possible to reduce a weight of the battery rack.

Figure 11:
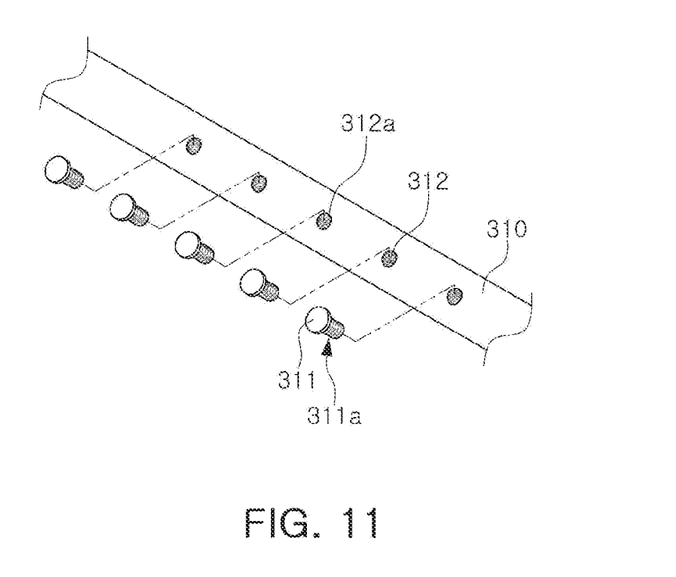
FIG. 11 is a perspective view of a cooling line according to another exemplary embodiment of the present disclosure.

FIG. 11 illustrates a cooling line 310 according to another exemplary embodiment of the present disclosure.

As shown in FIG. 11, a screw thread 311*a* may be formed on an outer periphery of an opening member 311, and a screw groove 312*a* corresponding to the screw thread 311*a* may be formed in a discharge hole 312 of the cooling line 310. By coupling the screw thread into the screw groove, the opening member 311 may be coupled to the cooling line 310. According to this exemplary embodiment, the cooling line 310 and the opening member 311 can be coupled to each other more firmly.

Figure 12:
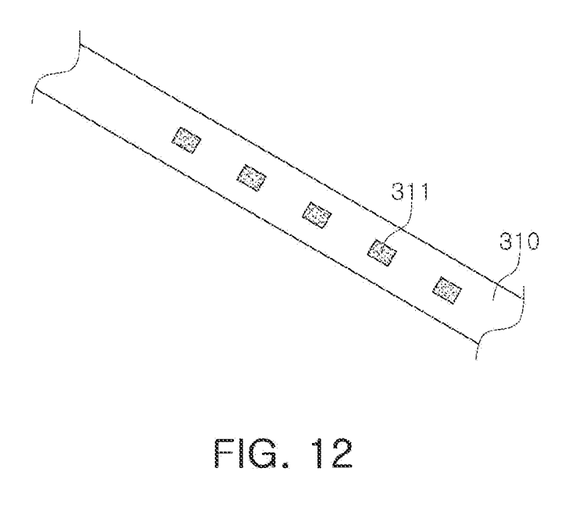
FIG. 12 is a perspective view of a cooling line according to another exemplary embodiment of the present disclosure.

Meanwhile, FIG. 12 illustrates a cooling line 310 according to another exemplary embodiment of the present disclosure. As shown in FIG. 12, an opening member 311 coupled to the cooling line 310 may have a rectangular shape. However, the present disclosure is not limited thereto, and the shape of the opening member 311 may be circular or a polygonal.

Figure 13:
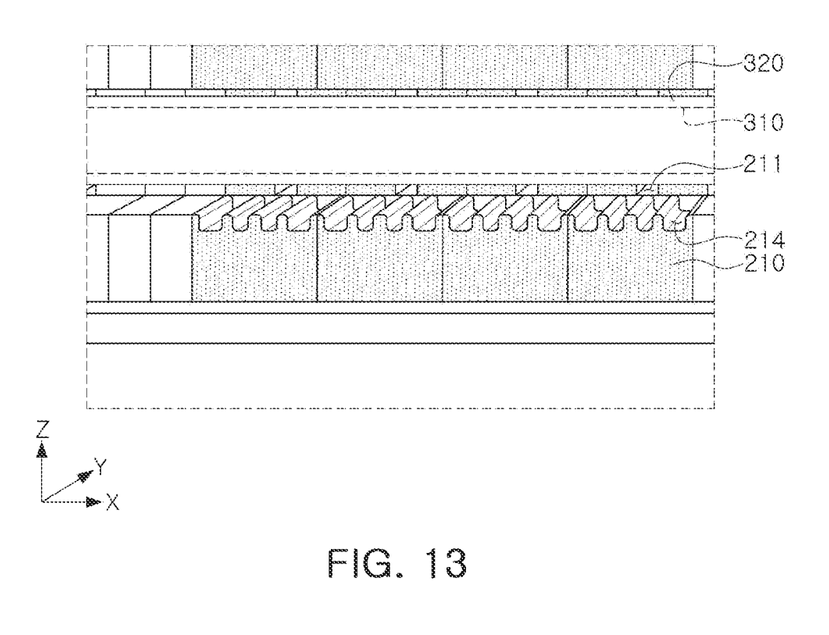
FIG. 13 is a partially enlarged perspective view of a battery rack according to another exemplary embodiment of the present disclosure.

FIG. 13 is a partially enlarged perspective view of a battery rack according to another exemplary embodiment of the present disclosure.

As shown in FIG. 13, in another exemplary embodiment of the present disclosure, a plurality of notches 214 may be provided in the outer periphery of the sub-module case 210. The notches 214 may be provided in the outer periphery of the sub-module case 210 to be connected to the vent hole 211.

The plurality of notches 214 may be provided in the outer periphery of the sub-module case 210 to be connected to one vent hole 211. The plurality of notches 214 may be disposed below the cooling line 310 and the fixing line 320 in the Z-axis direction, and may be provided as consecutive grooves in the Y-axis direction.

When the cooling line 310 is melted, the coolant present inside the cooling line flows into the vent hole 211, or the coolant that fails to flow in the vent hole 211 may fall into the notches 214 present below the cooling line 310 due to gravity.

Since the notches 214 are provided in the sub-module case 210 to be connected to the vent hole 211, the coolant present in the notches 214 is guided to the vent hole 211 by the notches 214. Therefore, the coolant can be supplied to the vent hole 211 more quickly, and flames or an explosion can be quickly extinguished, such that the fire or the explosion is quickly prevented from propagating to other areas. According to this exemplary embodiment, in a case in which flames or an explosion occurs in one area, it is possible to prevent the fire or the explosion from spreading to the entire battery rack.

In an exemplary embodiment of the present disclosure, the notches 214 may be provided in the sub-module case 210 to be inclined toward the vent hole 211. According to this exemplary embodiment, the coolant present in the notches 214 can be supplied into the vent hole 211 in a larger amount, and the coolant present in the notches 214 can be quickly supplied into the vent hole 211.

Figure 14:
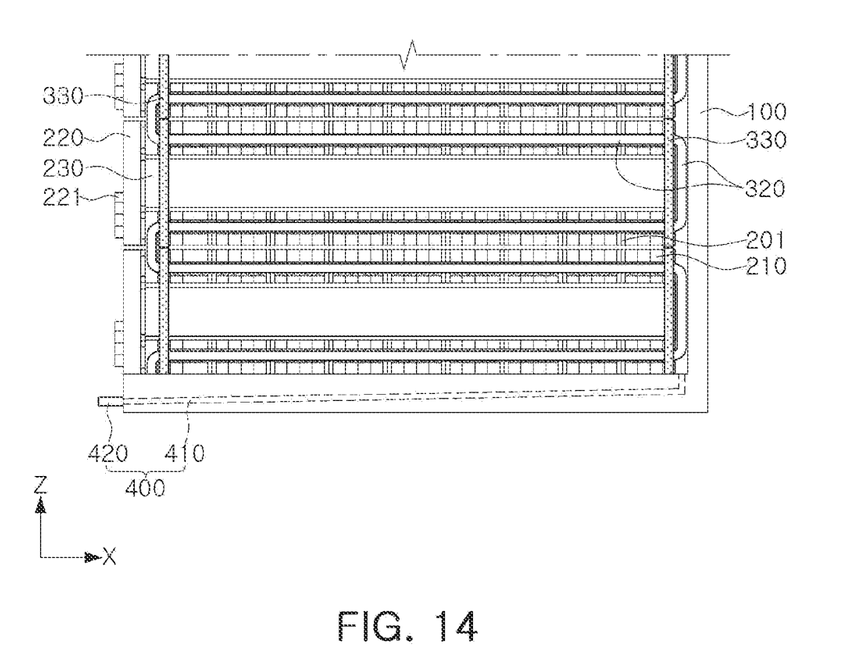
FIG. 14 is a partial side view of a battery rack according to another exemplary embodiment of the present disclosure.

FIG. 14 is a partial side view of a battery rack according to another exemplary embodiment of the present disclosure.

As shown in FIG. 14, the battery rack according to another exemplary embodiment of the present disclosure may further include a drainage unit 400 disposed below the cooling unit 300 (in FIG. 1) in the housing 100 and collecting the coolant falling to a lower side of the housing 100.

The drainage unit 400 may include a drain plate 410 disposed on the lower side of the housing 100 and allowing the coolant to fall thereonto, and a drain pipe 420 connected to the drain plate 410 and discharging the coolant to the outside of the housing 100.

The drain plate 410 may be provided to be inclined in the X-axis direction on the bottom surface of the housing 100. In an exemplary embodiment of the present disclosure, the drain plate 410 may be inclined to have a lowest height on the Z-axis at a point where the drain plate 410 is connected to the drain pipe 420. According to this exemplary embodiment, the coolant present on the drain plate 410 can be quickly supplied into the drain pipe 420.

A separate pump (not shown) or the like may be connected to the drain pipe 420 to suck the coolant. In addition, the drain pipe 420 may be provided with a filter (not shown) or the like to filter out foreign substances present in the coolant, and supply the coolant from which the foreign substances are filtered out to the cooling line 310 again. However, the present disclosure is not limited thereto, and the separate pump and the filter may be appropriately selected and applied according to environments where the battery rack is used, requirements for the battery rack, etc.

As set forth above, according to exemplary embodiments of the present disclosure, it is possible to suppress or prevent a battery cell from being overheated or ignited, and it is also possible to delay or prevent propagation from an area in which ignition starts to other areas.

In addition, according to exemplary embodiments of the present disclosure, it is possible to delay or suppress flames or an explosion in the battery rack.

While exemplary embodiments have been shown and described above, it will be apparent to those skilled in the art that modifications and variations could be made without departing from the scope of the present invention as defined by the appended claims.

What is claimed is:

1. A battery rack comprising:
a housing;
a module unit provided in the housing, including a plurality of battery cells, and having at least one vent hole; and
a cooling unit provided to face the vent hole in the housing, and including a cooling line in which a coolant is provided,
wherein the cooling unit further includes a fixing line accommodating the cooling line therein, and formed of a material having a different phase change temperature from a material of the outer periphery of the cooling line, and the fixing line includes an open portion and a hollow portion, and the open portion is formed by spacing ends of the fixing line apart from each other in a cross section of the fixing line in a thickness direction,
wherein the cooling line is accommodated in the fixing line to directly face the vent hole in the open portion, while being present in the open portion and the hollow portion,
wherein the cooling line includes a first material having a first phase change temperature on the outer periphery thereof, the fixing line includes a second material having a second phase change temperature on the outer periphery thereof, and the first phase change temperature is lower than the second phase change temperature, and
wherein the cooling line is provided so that at least a portion of an outer periphery thereof is melted by heat generated from the module unit to supply the coolant toward the vent hole.

2. The battery rack of claim 1, wherein the first material is rubber or thermoplastic plastic, and
the second material is metal.

3. The battery rack of claim 1, wherein the cooling line is accommodated in the fixing line to directly face each of the at least one vent hole, and
the fixing line surrounds at least 50% of the outer periphery of the cooling line.

4. The battery rack of claim 1, wherein the module unit is formed by stacking a plurality of sub-module cases, and
wherein the sub-module cases accommodate at least one of the battery cells, and the sub-module cases the vent hole.

5. The battery rack of claim 1, wherein the cooling line is formed of a plurality of materials having different phase change temperatures.

6. The battery rack of claim 5, wherein the cooling line includes a third material on the outer periphery thereof in an area facing the open portion, and a fourth material, having a higher phase change temperature than the third material, on the other outer periphery thereof.

7. The battery rack of claim 6, wherein the cooling line includes an opening member being present in the outer periphery thereof and formed of a material including the third material, and provided to be separated from the area formed of the fourth material.

8. The battery rack of claim 7, wherein the cooling line includes a discharge hole in the area facing the vent hole, and the opening member is inserted into the discharge hole.

9. The battery rack of claim 8, wherein a plurality of discharge holes are provided to each face a corresponding one of the at least one vent hole, and a plurality of opening members are inserted into the discharge holes, respectively.

10. The battery rack of claim 9, wherein the third material is rubber or thermoplastic plastic, and the fourth material is metal.

11. The battery rack of claim 4, wherein the sub-module case includes at least one notch provided in communication with the vent hole and guiding the coolant toward the vent hole.

12. The battery rack of claim 1, wherein the cooling unit further includes a fixing cover connected to the module unit or the housing to fix the cooling line.

13. The battery rack of claim 1, further comprising a drainage unit disposed below the cooling unit in the housing, and provided to collect falling coolant.

14. The battery rack of claim 13, wherein the drainage unit includes:

a drain plate disposed to be inclined on a lower side of the housing, and allowing the coolant to fall thereonto; and a drain pipe connected to the drain plate, and discharging the coolant to the outside of the housing.

* * * * *

UNITED STATES PATENT AND TRADEMARK OFFICE
CERTIFICATE OF CORRECTION

| | |
|---|---|
| PATENT NO. | : 12,444,787 B2 |
| APPLICATION NO. | : 17/844359 |
| DATED | : October 14, 2025 |
| INVENTOR(S) | : Yun Hee Kim et al. |

Page 1 of 1

It is certified that error appears in the above-identified patent and that said Letters Patent is hereby corrected as shown below:

In the Claims

In Column 12, Lines 60-61, please change "the sub-module cases the vent hole" to --the sub-module cases include the vent hole--.

Signed and Sealed this
Ninth Day of December, 2025

John A. Squires
*Director of the United States Patent and Trademark Office*